Figure 1:
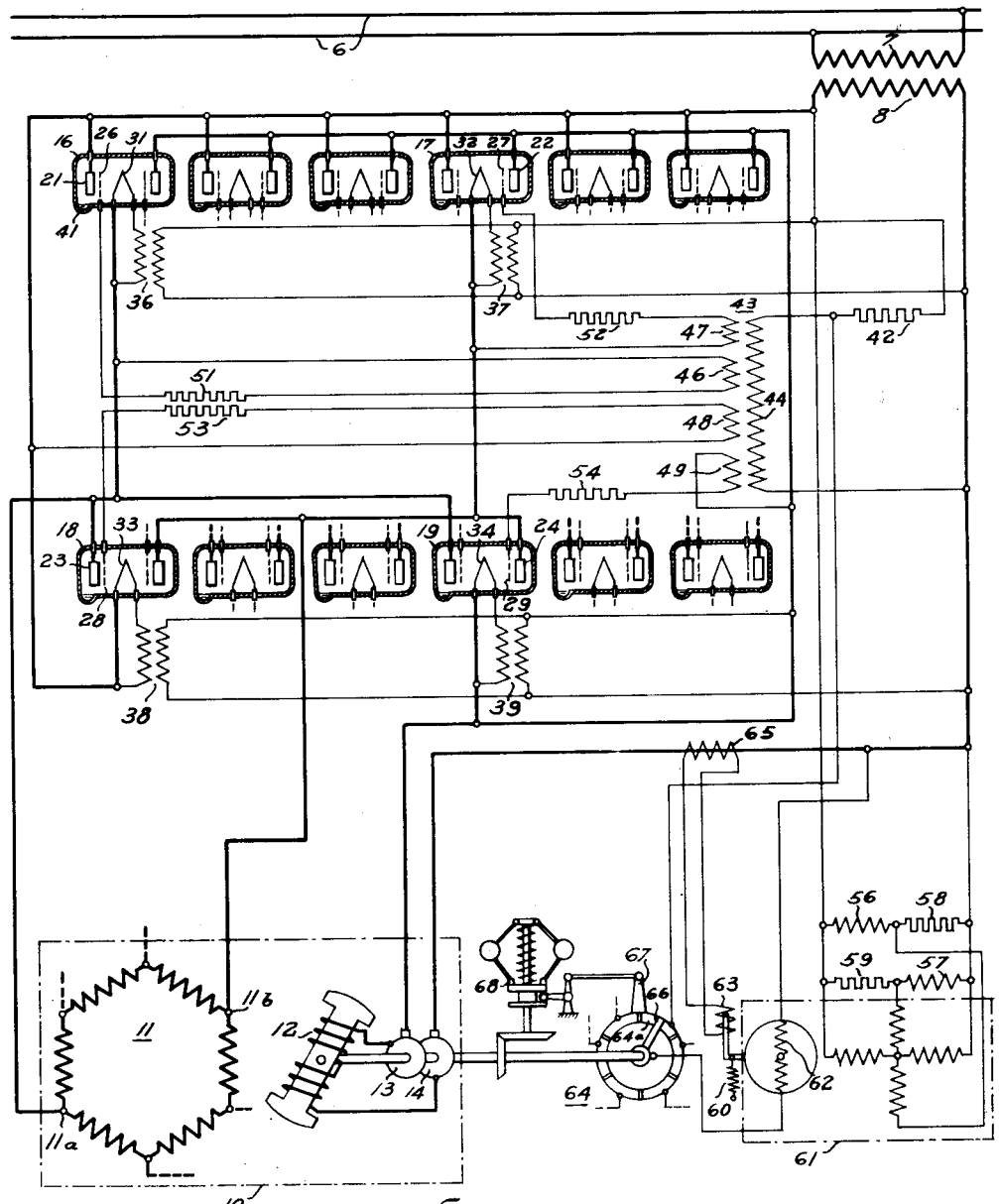

Patented Oct. 10, 1939

2,175,547

UNITED STATES PATENT OFFICE 2,175,547

MOTOR CONTROL SYSTEM

Didier Journeaux, Wauwatosa, Wis., assignor to Allis-Chalmers Manufacturing Company, Milwaukee, Wis., a corporation of Delaware Application February 3, 1933, Serial No. 655,015

11 Claims. (Cl. 172—120)

This invention relates to improvements in electric motor control systems and more particularly to the control of variable speed alternating current motors in which the armature currents are conducted by means of electron discharge devices.

It is well known that an alternating current motor of the so-called synchronous type may be operated at gradually variable speeds by effecting the commutation of the armature currents thereof by means of electron discharge devices provided with control electrodes. In systems of such character known heretofore, the motor armature was preferably connected in polygon and provided with a number of connection points, there being one electron discharge device for each connection point if the armature was to be short circuited or four such devices if the armature was to be conductively energized from the supply line. The cathodes of the several electron discharge devices employed in such a system are generally not all at the same potential and, as each control electrode must be energized at a potential considered relative to the potential of the associated cathode, the energization of such control electrodes by means of direct current sources such as batteries was necessarily complicated. The energization of the control electrodes also required the use of a plurality of single pole distributor switches or of at least one double pole distributor switch.

By energizing the control electrodes with alternating current, the use of additional sources is avoided as the control currents may be obtained from the supply line. The energization of the control electrodes may then be effected over a single distributor switch of the single pole type thereby controlling the operation of the electron discharge devices connecting the motor armature with both conductors of the line. The motor current obtained from the line may be converted into pulsating direct current by suitable connection of the motor with the supply transformer which permits the number of discharge devices to be reduced. The energization of the control electrodes of such devices is then preferably effected at a frequency which is a multiple of the supply line frequency. Such control permits regulation of the energization of the motor at any desired voltage within the limits permitted by the supply transformer therefor and the motor may be connected through such supply transformer without the interposition of switching devices, the motor then being started, reversed, and regulated by the control of the discharge devices.

It is therefore among the objects of the present invention to provide a control system for variable speed alternating current motors in which the motor armature currents are controlled by means of electron discharge devices.

Another object of the present invention is to provide a control system for variable speed alternating current motors whereby such motors may be brought to operating speed without using switching devices.

Another object of the present invention is to provide a control system for variable speed alternating current motors whereby the direction of rotation of the motors may be reversed without using switching devices.

Another object of the present invention is to provide a control system for variable speed alternating current motors employing electron discharge devices provided with control electrodes energized with alternating current voltages.

Another object of the present invention is to provide a control system for variable speed alternating current motors employing electron discharge devices provided with control electrodes energized an integer number of times during each cycle of the supply line voltage.

Another object of the present invention is to provide a control system for variable speed alternating current motors employing electron discharge devices provided with control electrodes energized with pulsating direct current.

Another object of the present invention is to provide a control system for variable speed alternating current motors employing electron discharge devices provided with control electrodes energized through a single distributor switch of the single pole type.

Figure 2:
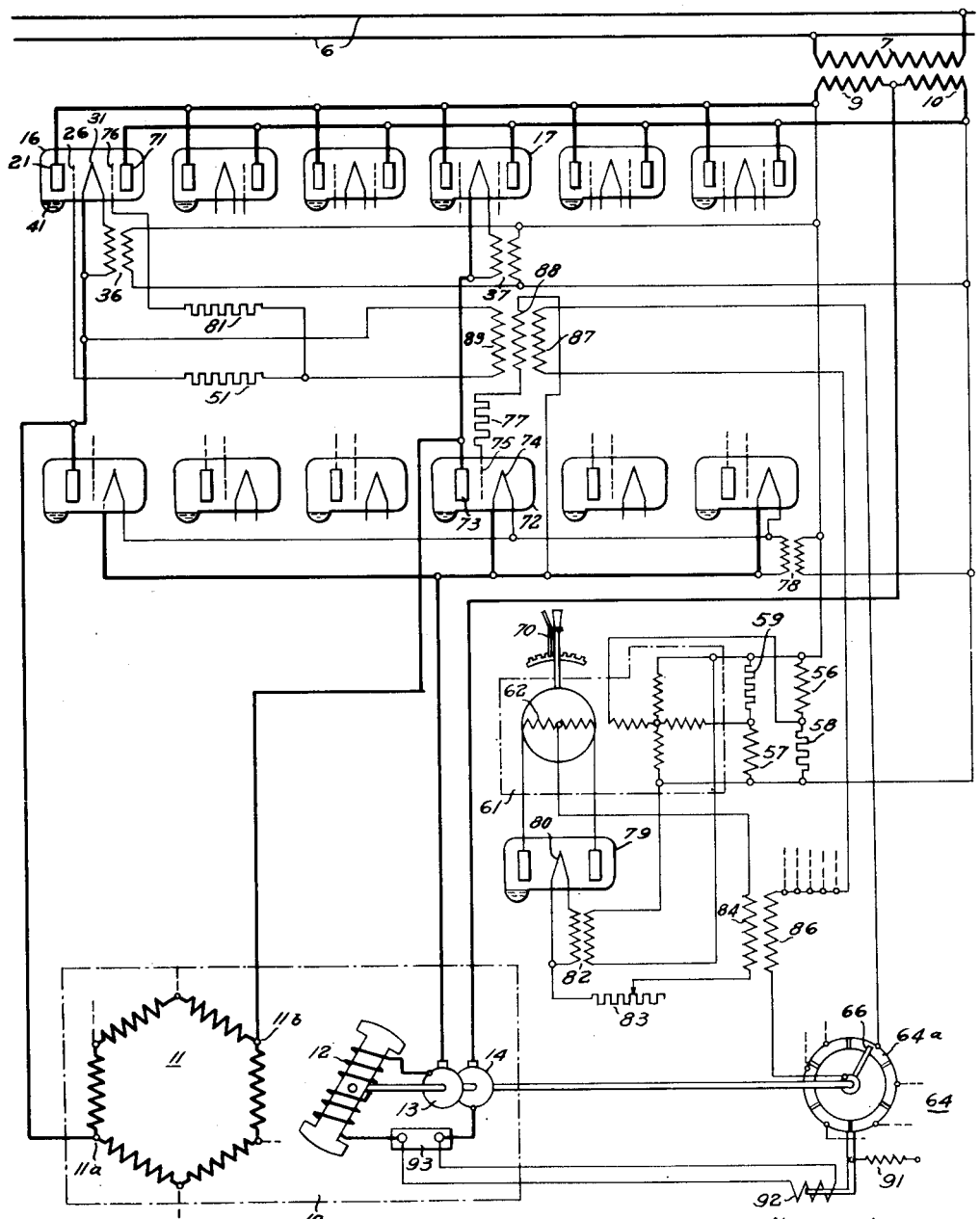
Figure 3:
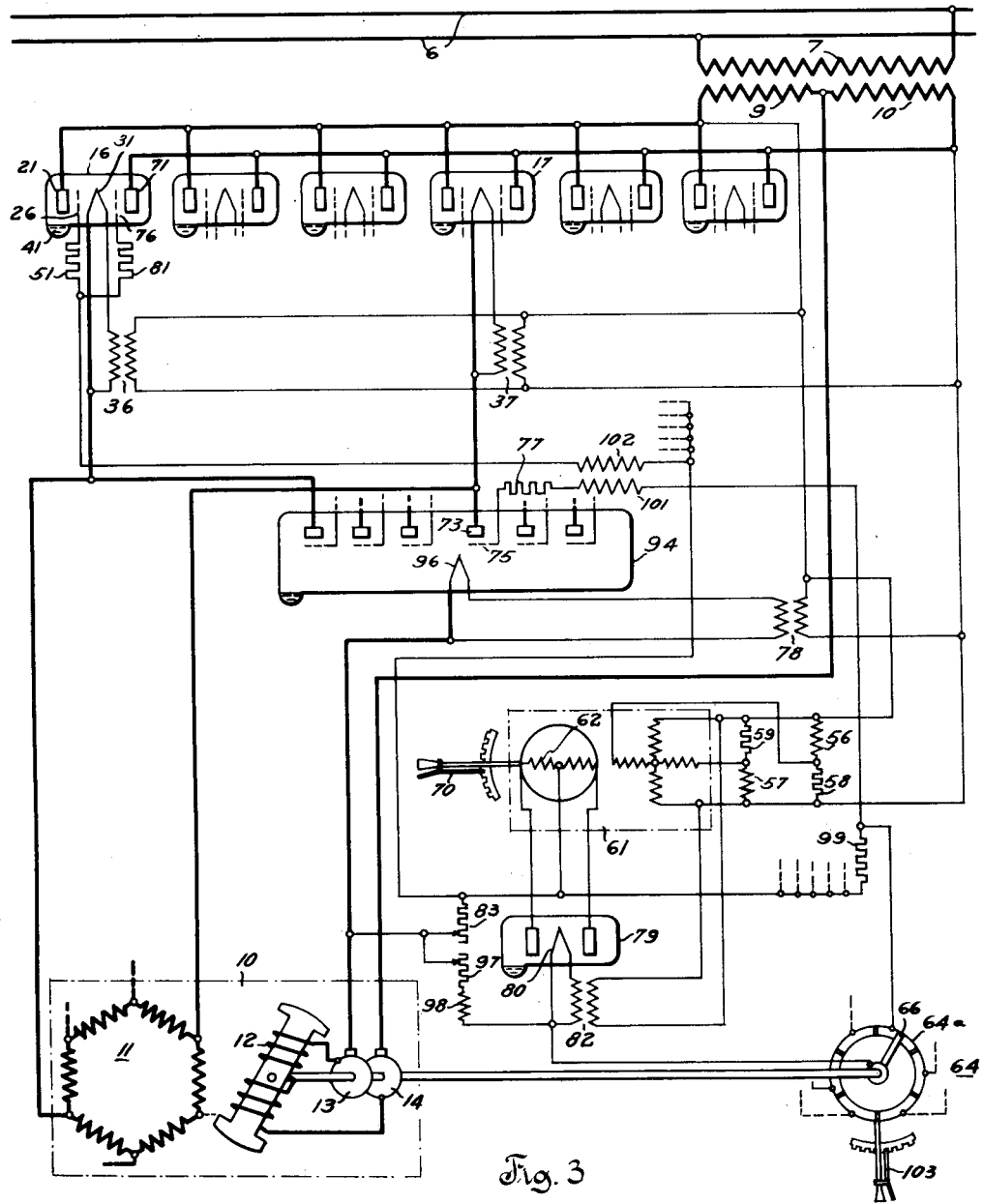

Objects and advantages other than those above set forth will be apparent from the following description when read in connection with the accompanying drawings, in which:

Fig. 1 diagrammatically illustrates one embodiment of the present invention applied to the control of a single phase alternating current motor of the series type whereby the motor receives regulated alternating current through electron discharge devices having control electrodes energized with alternating current at the supply line frequency to render the devices inoperative and also energized at the line frequency, but at a different phase, through a distributor switch to render the devices conductive;

Fig. 2 diagrammatically illustrates a modified embodiment of the present invention differing from the embodiment illustrated in Fig. 1 in that the motor is connected to receive pulsating direct current through electron discharge devices having control electrodes energized with alternating current at a frequency equal to twice the supply line frequency through a distributor of the single pole type; and Fig. 3 diagrammatically illustrates a further modified embodiment of the present invention differing from the embodiment illustrated in Fig. 2 in that several of the discharge devices are combined into a single device having control electrodes energized with pulsating direct current.

Referring more particularly to the drawings by characters of reference, reference numeral 6 designates an alternating current supply line herein illustrated as a single phase line. The motor illustrated in the present embodiment will, therefore, be of the single phase type but it will be understood that the system herein illustrated may be made operable to control a polyphase alternating current motor energized from a polyphase supply line by suitable duplication of the elements shown and suitable modification of some of such elements as will be apparent to those skilled in the art. Line 6 energizes the primary winding 7 of a supply transformer having a secondary winding illustrated in Fig. 1 as a winding 8 provided only with terminal connections. Transformer 7, 8 supplies current to a motor having an armature 11 connected in polygon and presenting a plurality of connection points such as 11a, 11b, etc. It will be assumed that armature 11 is stationary but it will be understood that such armature may be rotating, in which case the connections therewith would be effected over the usual slip rings. The motor is provided with a field winding 12 which is assumed to be rotating and connected over slip rings 13 and 14.

The connections between winding 8 and the motor are effected over a plurality of electron discharge devices such as 16, 17, 18 and 19 which are provided in the present embodiment in number equal to twice the number of connection points of armature 11. For the purpose of simplifying the drawings only such elements of devices 16 to 19 as will be referred to in the description of the operation of the system have been designated by reference numerals and only the connections of such elements have been shown in their entirety. Each of the discharge devices is provided with two anodes 21, 22, 23 and 24 and with two control electrodes 26, 27, 28 and 29 controlling the operation of such anodes. The cathodes 31, 32, 33 and 34 of the devices may be of any suitable type and are preferably of the incandescent type supplied with current from winding 8 through transformers 36, 37, 38 and 39. The discharge devices are preferably of the vapor type and therefore each contains a suitable vapor such as mercury vapor produced by a drop of mercury designated in device 16 at 41. Control electrodes 26, 27, 28 and 29 are energized from winding 8 over a resistance 42 and a transformer 43 having a primary winding 44. Each control electrode is energized over one of secondary windings 46, 47, 48 and 49 of the transformer, each having one terminal connected with the associated cathode, over one of resistances 51, 52, 53 and 54.

The control circuits further include reactors 56 and 57 and resistances 58 and 59 constituting a phase shifting circuit across which the primary winding of a phase shifter 61 is connected. The secondary winding 62 of phase shifter 61 is mounted on the rotor thereof and is prevented from continuously rotating by a spring 60. The phase of the output voltage of winding 62 depends on the position of the rotor of the phase shifter which may be adjusted by a solenoid 63 energized in dependence upon the motor current by a current transformer 65. Winding 62 is connected with one of the terminals of winding 8 and is connected with the primary winding of one of the control transformers such as 43 over one of the segments such as 64a of a distributor switch having a brush mounted on the shaft of motor 10. Such energization permits the several control transformer primary windings such as 44 to become sequentially energized from winding 62 instead of being directly energized from winding 8. The difference between the voltages of winding 8 and of winding 62 is then absorbed in resistance 42 due to the flow of a circulating current through such resistance and through windings 8 and 62. The position of the segments of distributor 64 may be adjusted by the lever 67 herein shown as being connected with a centrifugal governor 68 mounted on the shaft of the motor. In the present embodiment the motor will have a series characteristic as the flow of current occurs from one terminal of winding 8 over one of the electron discharge devices through armature 11, through another discharge device, and through winding 12 to the other terminal of winding 8, such circuit constituting the well known series connection.

In operation, assuming the system to be connected as shown in the drawings and line 6 to be energized, winding 7 connected therewith induces in winding 8 an alternating current voltage at the frequency of line 6. Assuming that brush 66 of distributor 64 is in contact with segment 64a thereof as shown in the drawings, all the control electrodes not designated by reference numerals are then energized from winding 8 over control transformers similar to transformer 43. The connections of the control transformers are such that each control electrode is energized with respect to the associated cathode at a voltage which is 180 degrees out of phase with the voltage of the associated anode so that all the associated anodes, which are likewise not designated by reference numerals, are maintained in an inoperative condition. The operation of the system will first be considered at a moment of a period during which winding 8 energizes anode 21 at a positive potential with respect to cathode 31 and anode 24 at a positive potential with respect to cathode 34. During such period, anode 22 is negative with respect to cathode 32 and anode 23 is negative with respect to cathode 33 so that devices 17 and 18 are entirely inoperative irrespective of the energization of control electrodes 27 and 28. During the period considered, control electrodes 26 and 29 are energized with respect to cathodes 31 and 34 at a voltage induced in windings 46 and 49 from winding 44; such winding is energized, as stated above, from winding 62 over brush 66 and segment 64a of distributor 64. The position of winding 62 is so adjusted that, at the moment considered, control electrodes 26 and 29 become positive with respect to associated cathodes 31 and 34. Anodes 21 and 24 are thereby made operable to carry current, such current flowing from winding 8 over anode 21, cathode 31, connection point 11a, armature 11, connection point 11b, anode 24, cathode 34, slip ring 13, winding 12, slip ring 14, back to winding 8. Such flow of current continues until the back E. M. F. in winding 11 reaches the value of the voltage of winding 8 so that such flow continues until not later than the end of the half cycle of the voltage of line 6 considered.

During the following half cycle of the voltage of line 6, anodes 21 and 24 are negatively energized with respect to the associated cathodes 31 and 34 and are therefore not operative. Anode 22 is then positively energized with respect to cathode 32 and anode 23 is positively energized with respect to cathode 33. During such period, control electrodes 27 and 28 become positive with respect to the associated cathodes 32 and 33 in a manner similar to that stated above for control electrodes 26 and 29. Such positive energization of control electrodes 27 and 28 then permits current to flow through anodes 22 and 23, such flow of current then occurring from winding 8 over slip ring 14, winding 12, slip ring 13, anode 22, cathode 32, connection point 11b, armature winding 11, connection point 11a, anode 23, cathode 33, back to winding 8. Armature 11 and field 12 thus receive a flow of alternating current during each cycle of the voltage of line 6, such flow continuing as long as brush 66 is in contact with commutator segment 64a; such flow of current may therefore extend over a period comprising a variable number of cycles of the voltage of line 6 depending upon the speed of the motor. The flow of current in windings 11 and 12 produces a torque which causes rotation of the motor field and also causes brush 66 to leave segment 64a and to come into contact with another segment of the distributor. Such rotation of brush 66 causes winding 62 to cease energizing control electrodes 26, 27, 28 and 29, and devices 16, 17, 18 and 19 thereupon become inoperative. Winding 62 then energizes the control electrodes of another group of devices thereby permitting the flow of current through such devices and through field 12 and armature 11 in a manner similar to that described above but over another pair of connection points of such armature. Such operation again impresses a torque on the motor field and causes continued rotation of such field in the same direction as at the first moment considered.

The above process is repeated sequentially for each pair of connection points of winding 11 during each revolution of the motor to impart to the field a substantially uniform torque in a continuous direction. Depending on the speed of the motor each pair of connection points is used during a variable number of successive cycles of the supply line voltage during each revolution of the field. The operation of the motor may be regulated by any means known in the art for the control of electron discharge devices. In the present embodiment it is assumed that the current taken by the motor is to be maintained at a substantially constant value. To obtain such result the position of winding 62 of phase shifter 61 is adjusted in dependence upon the motor current by solenoid 63 energized from current transformer 65. If the current in the motor exceeds the desired value solenoid 63 causes winding 62 to rotate against the action of spring 60 to retard the time of energization of each control electrode during each cycle of the voltage of the supply line, thereby causing the current to be reduced to the desired value thereof. If the current is below the desired value, spring 60 overcomes the action of solenoid 63 and rotates winding 62 in such a way as to advance the time of energization of the control electrodes and thereby again bring the current to the desired value. The relative position of the magnetic axis of armature winding 11 and of field 12 is determined by the position of the segments of distributor 64 relative to the position of the connection points of winding 11. To obtain the most advantageous operation of the motor it will generally be desirable to vary the position of such magnetic axis in dependence upon the speed of the motor, such variation being obtained by controlling the position of the segments of distributor 64 by any suitable speed responsive means such as centrifugal governor 68.

In the embodiment illustrated in Fig. 2 the input transformer energizing the motor is provided with two secondary winding portions 9 and 10 instead of a single secondary winding 8. The terminals of windings 9 and 10 are then connected with the anodes of electron discharge devices in number equal to the number of connection points of winding 11. Such connection points are connected with the anodes of a plurality of electron discharge devices such as 72 having their cathodes connected with slip ring 13. Slip ring 14 is then connected with the common point of windings 9 and 10. Discharge device 72 is of a type similar to that of device 16 except that it is provided with only one anode 73 and one control electrode 75. The cathodes of the several devices connected with slip ring 13 may be maintained at incandescence by means of a common transformer 78. Control electrode 75 of device 72 is energized over a resistance 77. The second anode of device 16 is designated by 71 and the associated control electrode 76 is energized over a resistance 81. In the present embodiment it is assumed that the position of phase shifter 62 may be adjusted manually by means of a lever 70, and that winding 62 supplies current to an electron discharge device 79 provided with anodes and with a cathode 80 which may be maintained at incandescence by means of a transformer 82 energized from windings 9 and 10. Winding 62 and device 79 constitute a rectifying system supplying current to the primary winding 84 of a transformer having a secondary winding 86, the magnitude of such current being adjustable by a rheostat 83. The current flowing through winding 84 and rheostat 83 is then a direct current pulsating at twice the frequency of the voltage of line 6, so that the voltage induced in winding 86 is an alternating current voltage likewise having twice the frequency of the voltage of line 6. It is understood that a direct current saturation of the core of transformer 84, 86 by the direct current component of the current in winding 84 may be avoided by any of the means known in the art. Winding 86 is connected with brush 66 of distributor 64 and energizes, therethrough, the primary winding 87 of a control transformer having a secondary winding 88 energizing control electrode 75 and another secondary winding 89 energizing control electrodes 26 and 76. A plurality of transformers similar to transformer 87, 88, 89, are provided for the control of the several control electrodes of the devices, the primary winding of each of such transformers being connected with winding 86 and with one of the segments of distributor 64. In the present embodiment, it is assumed that the position of distributor 64 is adjusted by a solenoid 92 energized from a shunt 93 in the motor circuit to move distributor 64 against the action of a spring 91.

In operation, again considering the system at a moment during the period of positive energization of anode 21 with respect to cathode 31, winding 62 is so adjusted by means of lever 70 that, at such moment, winding 86 impresses on winding 88 by way of winding 87 a voltage causing control electrode 75 to be positively energized with respect to cathode 74 and causing control electrodes 26 and 76 to be positively energized with respect to cathode 31 from winding 89. Anodes 21 and 73 are thus made operable to carry current, such current flowing from winding 9 over anode 21, cathode 31, connection point 11a, armature winding 11, connection point 11b, anode 73, cathode 74, slip ring 13, field winding 12, slip ring 14 to the common point of windings 9 and 10. During the next half cycle of the voltage of line 6, anode 21 becomes negative with respect to cathode 31 and cannot carry current, and anode 71 then becomes positive with respect to cathode 31. During such period winding 87, which receives current at twice the frequency of the voltage of line 6, again causes control electrode 75 to become positive with respect to cathode 74 and control electrodes 26 and 76 to become positive with respect to cathode 31. Current then flows from winding 10 over anode 71, cathode 31, connection point 11a, armature winding 11, connection point 11b, anode 73, cathode 74, slip ring 13, field winding 12, slip ring 14, to the common point of windings 9 and 10. Such flow of current occurs repeatedly in a sequence and for a period of time already stated with respect to the embodiment illustrated in Fig. 1.

In the present embodiment, the motor current may be manually adjusted to any desired value by movement of lever 70, such movement causing the control electrodes to be energized at a different moment of the voltage cycle of line 6. The position of distributor 64, which determines the position of the magnetic axis of winding 11 relative to that of field winding 12, is adjusted in dependence upon the motor current by solenoid 92, thereby imparting to the motor a characteristic which differs from the ordinary series characteristic of a motor not provided with such adjustment. In the present embodiment, armature 11 and field 12 receive pulsating current in a continuous direction whereas in the embodiment illustrated in Fig. 1 such windings received alternating current. The torque exerted by the flow of such current in the two embodiments is, however, substantially the same as the relative direction of flow of the currents in the armature and in the field remain the same at every moment in the two embodiments.

In the embodiment illustrated in Fig. 3, the electron discharge devices such as 72 in Fig. 2 are shown replaced by a unit device 94 provided with a cathode 96 energized from transformer 78. In the present embodiment, device 79 supplies current to a circuit including rheostat 83, another rheostat 97 and a reactor 98. The point of connection of rheostats 83 and 97 is connected with cathode 96 of device 94. The negative terminal of rheostat 83 is connected through resistances as at 99 with the segments of distributor 64 and with the control electrodes of device 94 over the primary windings as at 101 of control transformers having secondary windings as at 102. The secondary windings of the control transformers are connected with the negative terminal of rheostat 83 and energize the control electrodes of the devices as at 16, winding 102 being shown as energizing control electrodes 26 and 76 over resistances 51 and 81. Due to the connection of the circuits of device 79, the control electrodes of device 94 are generally maintained at a negative potential with respect to cathode 96 by the amount of the voltage drop in rheostat 83. Due to the insertion of reactor 98 into the circuit of rheostat 83, the current flowing therethrough is a substantially uniform direct current, and the voltage drop across rheostat 83 is a substantially uniform direct current voltage. The voltage impressed between cathode 96 and brush 66 of distributor 64 is an alternating voltage having for amplitude the value of the pulsation of the output voltage of device 79.

In operation, again considering the period during which anode 21 is positively energized with respect to cathode 31 and anode 73 positively energized with respect to cathode 96, control electrodes 26, 76 and 75 are negatively energized with respect to the associated cathodes 31 and 96 by the connection of such control electrodes with rheostat 83. Winding 62 of phase shifter 61 is so adjusted that, at a moment during the period of positive energization, control electrode 75 becomes positively energized with respect to cathode 96 over brush 66 and segment 64a of distributor 64. Control electrode 75 then acts as an anode and carries current which flows over winding 101. The flow of current in such winding causes a voltage impulse to be induced therein and in winding 102, such voltage impulse momentarily bringing control electrodes 26 and 76 to a positive potential with respect to cathode 31. Anodes 21 and 73 are then operable to carry current and current flows in the manner described with respect to the embodiment of Fig. 2. During the next half cycle of the voltage of line 6, anode 71 is positively energized with respect to cathode 31 and during such period control electrodes 75, 26 and 76 are again positively energized with respect to the associated cathodes. Current then flows through anodes 71 and 73 as already described with respect to the embodiment of Fig. 2.

In the present embodiment, the segments of distributor 64 are assumed to be manually adjustable by means of a lever 103 whereby the energization of the control electrodes of the device may be advanced or retarded with respect to the spatial position of field 12. The particular connection point of winding 11 through which current flows at any particular time may thus be selected with respect to the position of field winding 12, thereby adjusting the magnitude of the torque caused by the interaction of currents in the armature and in the field windings. If lever 103 is moved in a direction opposite to the direction of rotation of the motor, the torque will gradually decrease in value and reach zero when the distributor segments have been rotated by an angle of 90 electrical degrees. Further shifting of the distributor segments will cause the motor currents to produce a torque opposite to the torque previously produced, thereby causing reversal of the direction of rotation of the motor without using switching devices and without necessitating the expenditure of electrical energy in resistances. It will be understood that such manual reversal of the direction of rotation may also be provided when the segments of the distributor are continuously adjusted by automatic means such as solenoid 93 illustrated in Fig. 2 or speed governor 68 illustrated in Fig. 1.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a control system for electric motors, a supply line, an electric motor, electric valves of the electron discharge type connected with said line and with said motor to control operation thereof, said valves having anodes with associated control electrodes and each having a cathode, the control electrodes controlling flow of current through said valves and being connected for energization from said line, a distributor operated by the shaft of said motor to control the energization of the control electrodes to start said motor, to control the speed thereof, and to reverse the direction of operation of the same, and means operated responsive to and in dependence upon the speed of said motor for automatically varying the adjustment of said distributor.

2. In a control system for electric motors, an alternating current supply line, an electric motor, electric valves of the electron discharge type connected with said line and with said motor to control operation thereof, said valves having anodes with associated control electrodes and each having a cathode, the control electrodes controlling flow of current through said valves and being connected for energization from said line, a distributor operated by the shaft of said motor and controlling the energization of the control electrodes and thereby controlling operation of said motor, and means comprising a speed governor operated by said motor to vary the operation of said distributor in response to the speed of said motor.

3. In a control system for electric motors, an alternating current supply line, an electric motor, electric valves of the electron discharge type connecting said line with said motor to control the flow of current therethrough, said valves having anodes and each having a cathode and being controlled by control electrodes, a transformer connected with the control electrodes, a phase shifter having a movable winding, one terminal of the movable winding and of the transformer primary winding being connected, the other terminal of the movable winding and of the primary winding of said transformer being connected with said line, and a distributor operated by said motor and controlling connection of said transformer and said phase shifter with the control electrodes to control energization thereof.

4. In a control system for electric motors, an alternating current supply line, an electric motor, electric valves of the electron discharge vapor filled type connecting said line with said motor to control the flow of current therethrough, said valves having electrodes to control the flow of current therethrough, means adjustable in response to the flow of current through said motor and connecting the control electrodes with said line, and means variably adjustable responsive to and in dependence upon the speed of said motor and controlling the connection of the first said means with the control electrodes, the last said means being operated by said motor.

5. An electric power translating system comprising a source of current, an electric motor, means including a plurality of electric valves interconnecting said source and said motor to transmit energy therebetween, each of said valves being provided with a control electrode, a mechanism comprising a stationary element and a rotating element driven by said motor for successively exciting the control electrodes of said valves, and means responsive to the speed of said motor for varying the angular position of one of said elements.

6. In a control system for electric motors, a supply line, an electric motor, electric valves of the electron discharge type connected with said line and with said motor to control operation thereof, said valves having anodes with associated control electrodes and each having a cathode, the control electrodes controlling a flow of current through said valves and being connected for energization from said line, a distributor operated by the shaft of said motor to control the energization of the control electrodes to control the speed of said motor, and means operated responsive to and in dependence upon the speed of said motor for automatically varying the adjustment of said distributor.

7. In combination, an alternating current supply circuit, an electric motor, an electric valve comprising a cathode and an anode connecting said supply circuit with said motor for the flow of energy therebetween, and means for controlling the said flow of energy comprising a control electrode associated with said anode, a permanent connection between said control electrode and said supply circuit for impressing a symmetrical sinusoidal alternating voltage in one phase relation with the voltage of said supply circuit between said control electrode and said cathode during periods of flow of energy through said motor, another connection between said control electrode and said supply circuit for impressing a second alternating voltage in another phase relation with the voltage of said supply circuit between said control electrode and said cathode to thereby overcome the action of the first said alternating voltage, and means asynchronous with respect to said supply circuit operable to interrupt continually the second said connection.

8. In combination, an alternating current supply circuit, an electric motor, an electric valve comprising a cathode and an anode connecting said supply circuit with said motor for the flow of energy therebetween, and means for controlling the said flow of energy comprising a control electrode associated with said anode, a permanent connection between said control electrode and said supply circuit for impressing a symmetrical sinusoidal alternating voltage in one phase relation with the voltage of said supply circuit between said control electrode and said cathode during periods of flow of energy through said motor, another connection between said control electrode and said supply circuit for impressing a second alternating voltage in another phase relation with the voltage of said supply circuit between said control electrode and said cathode to thereby overcome the action of the first said alternating voltage, and means operating in dependence upon the movement of said motor continually operable to interrupt the second said connection.

9. In combination, an alternating current supply circuit, a load circuit, an electric valve comprising a cathode and an anode interconnecting said circuits for the flow of energy therebetween, and means for controlling the said flow of energy comprising a control electrode associated with said anode, a permanent connection between said control electrode and said supply circuit for impressing a symmetrical sinusoidal alternating voltage in one phase relation with the voltage of said supply circuit between said control electrode and said cathode during periods of flow of energy through said motor, another connection between said control electrode and said supply circuit for impressing a second alternating voltage in another phase relation with the voltage of said supply circuit between said control electrode and said cathode to thereby overcome the action of the first said alternating voltage, and means asynchronous with respect to said supply circuit operable to interrupt continually the second said connection.

10. In combination, an alternating current supply circuit, a load circuit, an electric valve comprising a cathode and an anode interconnecting said circuits for the flow of energy therebetween, and means for controlling the said flow of energy comprising a control electrode associated with said anode, a permanent connection between said control electrode and said supply circuit for impressing a symmetrical sinusoidal alternating voltage in one phase relation with the voltage of said supply circuit between said control electrode and said cathode during periods of flow of energy through said motor, another connection between said control electrode and said supply circuit for impressing a second alternating voltage in another phase relation with the voltage of said supply circuit between said control electrode and said cathode to thereby overcome the action of the first said alternating voltage, and means synchronous with respect to said load circuit operable to interrupt continually the second said connection.

11. Apparatus consisting of an A. C. power supply; a series type motor operated from said supply; a control circuit; a grid controlled arc rectifying tube in said control circuit; means for supplying an A. C. voltage to the grid of said tube; and means, controlled by changes in current passing through the motor, for varying the phase relation of the voltage applied to the grid with respect to the anode voltage of said tube, to maintain said motor current substantially constant from zero speed to any desired speed within the speed range of the motor.

DIDIER JOURNEAUX.